United States Patent [19]

Fremaux

[11] Patent Number: 5,269,108
[45] Date of Patent: Dec. 14, 1993

[54] HEATED GLAZED WALL

[75] Inventor: Jacques Fremaux, Bougival, France

[73] Assignee: Saint-Gobain Vitrage International, Courbevoie, France

[21] Appl. No.: 735,686

[22] Filed: Jul. 29, 1991

Related U.S. Application Data

[63] Continuation of Ser. No. 427,771, Oct. 27, 1989, abandoned.

[30] Foreign Application Priority Data

Oct. 27, 1988 [FR] France .................. 88 14009

[51] Int. Cl.$^5$ .................. E06B 7/02; H05B 3/84
[52] U.S. Cl. .................. 52/302.1; 52/171; 52/172; 52/209; 52/790
[58] Field of Search .............. 52/171, 304, 172, 302.1, 52/209, 788, 789, 790

[56] References Cited

U.S. PATENT DOCUMENTS

| | | | |
|---|---|---|---|
| 4,066,815 | 1/1978 | Olink et al. | 52/171 |
| 4,377,613 | 3/1983 | Gordon | 52/171 |
| 4,562,095 | 12/1985 | Coulon et al. | |
| 4,687,687 | 8/1987 | Terney et al. | 52/171 |
| 4,733,504 | 3/1988 | Lindgren | 52/171 |

FOREIGN PATENT DOCUMENTS 0125153 11/1984 European Pat. Off. .
8502649 6/1985 World Int. Prop. O. .

*Primary Examiner*—Michael Safavi
*Attorney, Agent, or Firm*—Oblon, Spivak, McClelland, Maier & Neustadt

[57] ABSTRACT

A glazed wall has an inside glazing and an outside glazing which define a space through which outside air can circulate past the inside glazing for discharge into the room. A low radiation emissivity layer is formed on at least one face of the inside glazing for reducing radiative heat transfer to the outside glazing. This low radiation emissivity layer can also constitute an electrical heating layer for heating the inside glazing.

3 Claims, 3 Drawing Sheets

HEATED GLAZED WALL

This application is a continuation of application Ser. No. 07/427,771, filed on Oct. 27, 1989, now abandoned.

BACKGROUND OF THE INVENTION

Field of the Invention

This invention relates to a glazed wall intended to separate a room from the outside in which a glazing is heated electrically and where air circulates along the heated glazing before being distributed in the air of the room.

It is known to improve the performance of a glazed wall separating a heated room from the outside environment by forming this wall with double transparent panes or plates and making air circulate between the two panes, the air often being drawn from the outside and then mixed with air from the room. Many such systems have been proposed. Their advantage resides in the fact that the heat loss is reduced relative to that of the same wall without such air circulation but with direct introduction of outside air.

Nevertheless, with known walls, because at least one part of the air which circulates along the inside glazing is drawn from outside the building, the temperature of the inside glazing remains lower than that of the internal partitions of the building which constitute the other walls of the room. As a result, the space in the vicinity of the outside wall is relatively cold and its use is generally limited. It would be advantageous to be able to raise the surface temperature of this wall. It has been proposed to do so by insulating it more, for example by replacing the simple inside glazing with a double pane insulating glazing. Comfort is thus improved but the replacement air which runs along the wall is then heated less and the overall heat balance is not appreciably improved.

It has been thought to improve the situation by directly using the heat supply for heating the room to increase the surface temperature of the glazing which constitutes the inner face of the glazed wall separating the room from the outside. European patent EP 102 987 B thus proposes heating the replacement air before its passage along the wall. This system is satisfactory but a part of the energy supplied is used for needlessly reheating the outside wall.

A variant of the preceding system in which one of the glazings constituting the wall itself is heated has also been proposed. Generally, in this case, a transparent conducting layer consisting of a thin layer of metal deposited under vacuum is used. Such a system exhibits obvious advantages since the supply of heat is there where it is the most useful, to the room itself, and it makes it possible to incorporate additional functions into the glazed wall, i.e., both natural lighting and air replacement and heating.

However, the energy loss of this known system is significant. The heat exchange between the two glazings constituting the wall, i.e., the inner heated glazing and the outer glazing at a lower temperature, is considerable. For this reason, in U.S. Pat. No. 4,641,466, it was proposed that the glazing opposite the heated glazing be equipped with a layer capable of reflecting infrared rays so as to send back the heat radiation emitted by the heated glazing, thus reducing the escape of heat.

Various devices also are known which make possible the use of heated glazings under good operating conditions. Thus, for example, European Patent application EP 165287 proposes regulation of the glazing temperature and, like French patent FR 2 180 433, an automatic cutoff of the power supply when it becomes unnecessary or dangerous to maintain it.

But these latter glazed walls, although they exhibit advantageous technical solutions, are complicated and consequently difficult to use and, generally, are expensive.

SUMMARY OF THE INVENTION

The invention has as an object to provide a heated wall with air circulation, which is efficient and simple while remaining inexpensive.

A further object of the invention is to provide the same comfort as in existing systems but with a lower operating cost and a much smaller installation cost.

The above, and other objects are achieved according to the present invention by a glazed wall comprising an inside glazing positioned facing the interior of a room for which the glazed wall forms an exterior wall, an outside glazing positioned facing an outside environment which may be at low temperature, the inside and outside glazings forming a space through which outside air can circulate past the inside glazing for discharging into the room, electrical heating means for heating the inside glazing so that heat is transferred by conduction to the air circulating in the space, and a low radiation emissivity layer on at least one face of the inside glazing so that radiative heat transferred to the outside glazing is reduced.

According to a further feature of the invention, the low emissivity layer is formed of a transparent semiconducting metal oxide such as a 420 nm layer of a fluorine doped $SnO_2$.

According to a further feature of the invention, electrical leads are connected to the low emissivity layer so that it also comprises the electrical heating means. In this case, means should be provided for selectively cutting off the power supply to the electrical heating means, particularly if it becomes accessible to the people inside the room.

The glazed wall according to the invention exhibits appreciable advantages relative to the conventional art. On a technical plane, when the layer with low emissivity is directed toward the cold side of the wall, the heat radiation emitted by the heated glazing is mostly toward the inside of the room which very considerably reduces the losses since the heat emitted via conduction to the outside essentially is recovered thanks to the air circulation. This technical advantage brings about another advantage which relates to comfort. Under given heat conditions such as inner and outer temperatures, air flow and electrical energy provided to the heated glazing, the temperature of the wall on its face directed toward the inside of the room will be higher which will improve comfort. The other way of assessing the advantages of the invention is economic: the fact of using the same layer as a heating element and as "radiative" insulator limits the investment cost of the wall. Moreover, instead of having a higher wall temperature, the same surface temperature may be maintained but the electrical energy necessary to maintain this temperature will be considerably reduced.

As further illustrated, let R be the overall heat resistance which exists between the outside surface of the inner heated glazing and the outside glazing. By definition, the heat exchanges between the two glazings are measured by flow F:

$$F = \frac{T_I - T_E}{R}$$

where $T_I$ and $T_E$ respectively are the inside and outside temperatures on the walls, on both sides of the air space.

Heat resistance R is composed of two parts, one $R_c$ relates to air replacement and conduction-convection of the air space, and the other $R_R$ relates to heat radiation. These resistances conventionally are related by the equation:

$$\frac{1}{R} = \frac{1}{R_c} + \frac{1}{R_R}$$

The heat insulation system known as "parietodynamic" which consists of making the replacement air (optionally mixed with air taken from the room itself) circulate between the two plates constituting the outside wall of the room has the effect of very considerably increasing the value of $R_c$.

Let us suppose that the latter has been multiplied by 10:

$$\frac{1}{R} = \frac{1}{10R_c} + \frac{1}{R_R}$$

It is seen that then, if $R_c$ and $R_R$ are of the same order, any modification of $R_R$ will be reflected virtually entirely on the heat resistance of the unit and therefore on the heat flow which results from a given temperature gradient. If, for example, $R_R$ is doubled, the resulting flow will be divided virtually in two. Any action on the radiation emitted by the warm plate will be immediately reflected in the heat losses.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
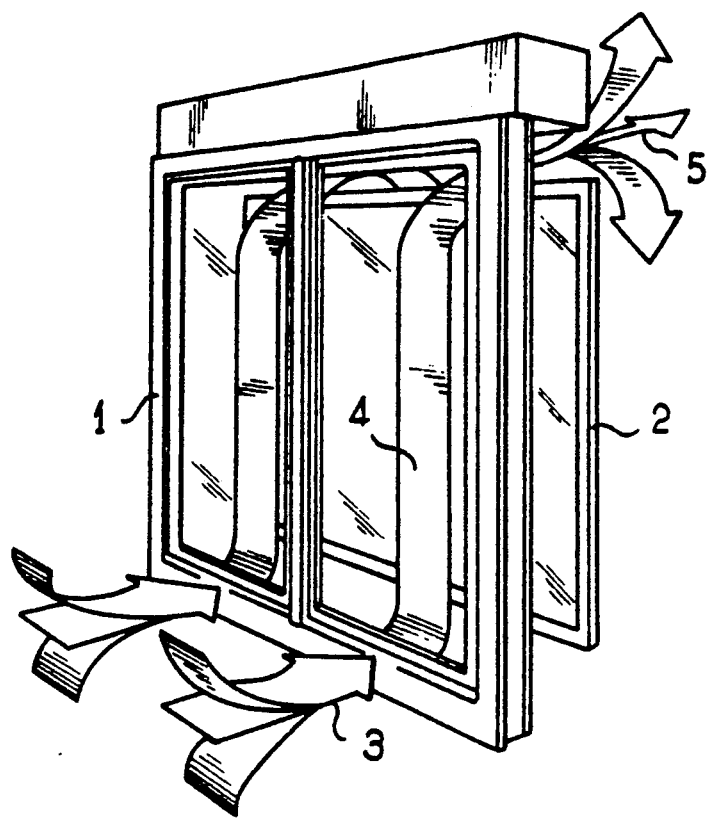
FIG. 1 shows a window with conventional parietodynamic insulation.

In FIG. 1, a window with parietodynamic insulation is seen. An outside frame 1 having a glazing is doubled by a similar inside frame 2. These frames are connected in an airtight manner to a wall to produce a double glazed wall. The wall is thus sealed with the exception of lower openings in the outside frame and upper openings in the inside frame. A controlled, mechanical ventilation system keeps the inner air of the room in partial vacuum so as to suck in a flow of outside air. The flow is, for example, of a volume equal to that of the room per hour. The thin streams of outside air are shown at 3, the air circulates at 4 between the glazings of the frames and then enters at 5 into the room. The above is exemplary and other types of walls are possible. For example, the number of frames can be different, the direction of the air circulation and the proportion of recycled air can be changed. But the principle remains that the fresh air drawn from the outside circulates along a wall that is contiguous to the inside space of the room.

Figure 2:
FIG. 2 is a detail of the panes of such a window.
Figure 2:
Figure 2:

FIG. 2 illustrates the simplest system. Air circulates upward between inside and outside glazings 6 and 6a, each consisting of a simple pane.

Figure 3:
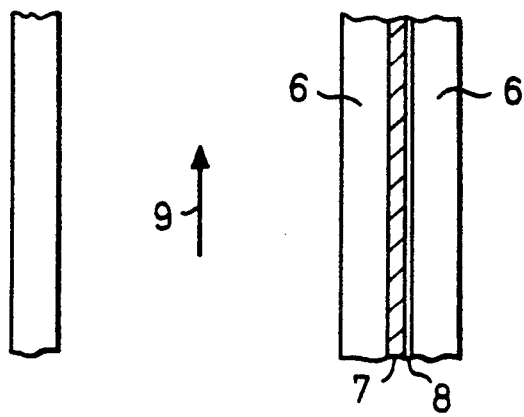
FIG. 3 is a heated variant.

The same system, but equipped with a heated glazing that has been known, is shown in FIG. 3. At the side of the wall closest to the room interior, there is positioned a laminated glazing 6 consisting of two outer glass sheets 6' separated by an intermediate plastic sheet 7 formed, for example, of polyvinyl butyral (PVB). One of the sheets 6' is equipped on its face in contact with the PVB layer 7 with a transparent conducting layer 8 which, for example, consists of silver deposited by cathode sputtering. This conducting layer 8 is positioned between two layers of a transparent oxide such as tin oxide which protect the silver and increase light transmission. The conducting layer 8 is supplied with electric current via electrodes in strip form and consisting, for example, of a silver enamel. To avoid the breakage that heat stresses would bring about in all the glasses of a wall similar to that of FIG. 3 and the following figures, it is preferable to form them from tempered glass.

When such a heated glazing is used in a partition with parietodynamic insulation, heat regulation systems of a well known type, for example one as described in European patent application EP 165287 may be used.

Figure 5:
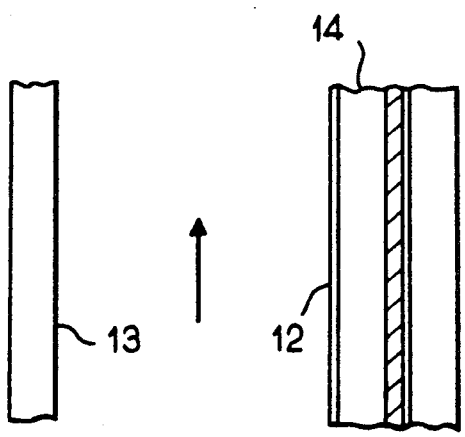
FIGS. 5, 6 and 7 are details of walls according to the invention.

The heated walls of the type of FIG. 3 are equipped, according to the invention, with a layer 12 having low emissivity to improve their efficiency (FIG. 5). Such a layer 12, given the role that it is to play, should be directed toward the outside of the laminate 14 forming the inside wall, either on the side thereof facing the current of replacement air (symbolized by arrow 9), or on the other side of the laminate. In all cases it is necessary to be able to keep this layer 12 clean. It therefore should be mechanically strong enough to be able to undergo the operations of normal maintenance. Metal layers of the type of layer 8 described above generally are not suitable for this purpose. Rather it is suitable to use a layer of a semiconducting oxide which is deposited hot such as, for example, an $SnO_2$ doped with fluorine as described in European patent application EP 125153. These layers have the property of considerably reducing the emission of heat radiation of the glass which is equipped with it.

Figure 4:
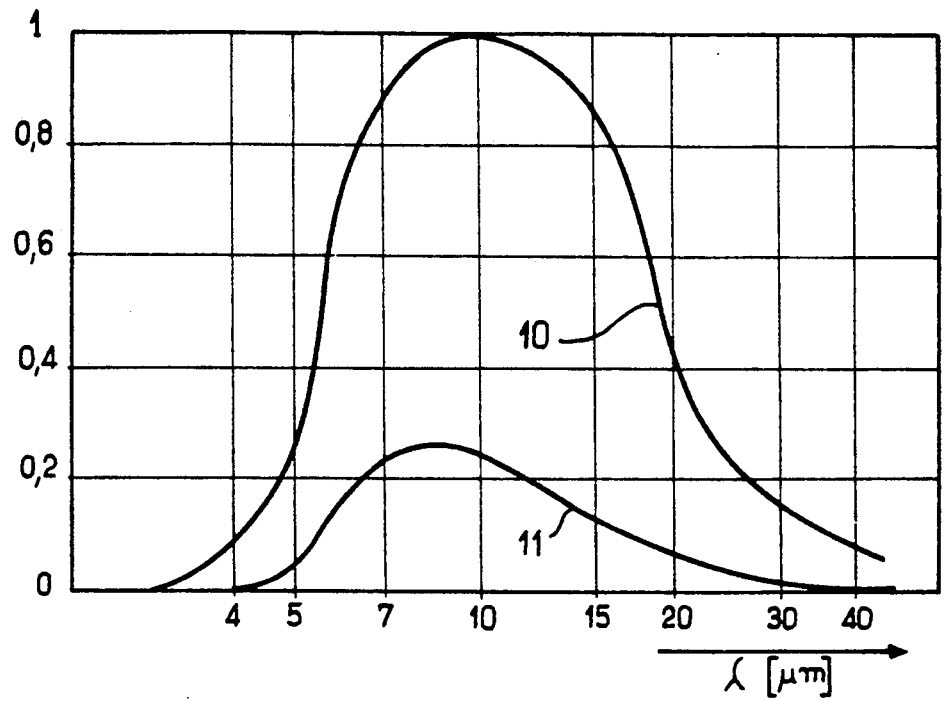
FIG. 4 shows the energy emitted respectively by a blank pane and by a glass pane coated with a layer with low emissivity.

In FIG. 4, there is shown at 10 the spectrum of radiation emitted at a temperature of 20° C. by the surface of a nontreated soda lime silica glass and, at 11, by the surface of the same glass at the same temperature but equipped with a semi-conductive fluorine-doped $SnO_2$ layer with a thickness of 420 nm as the low emissivity layer 12. It is seen that the energy emitted by the curve 11 is much less than that emitted by the curve 10.

FIG. 5 shows the same parietodynamic system as that of FIG. 3 but equipped, according to the invention, with the layer 12 which limits the emission of heat rays such as those, in particular, which would be absorbed by cold outside glass pane 13 located opposite heated interior glazing laminate 14.

Figure 6:
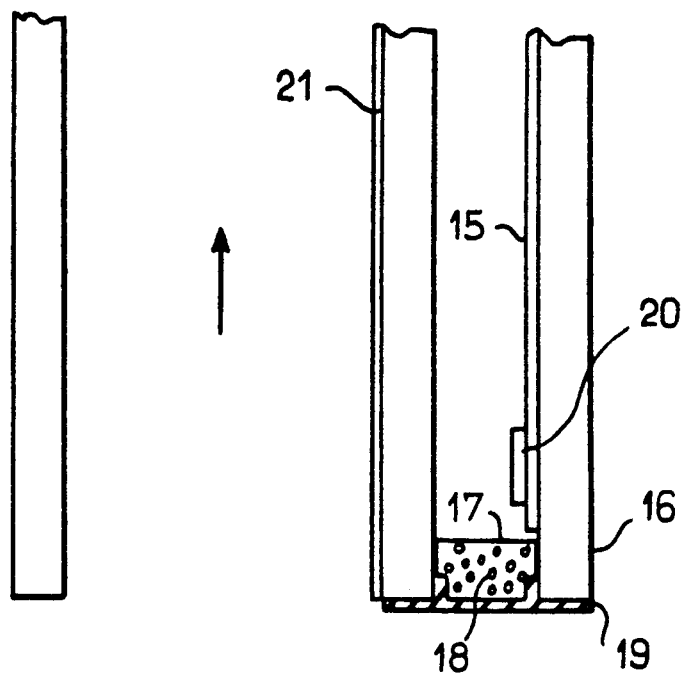

In FIG. 6, a wall with parietodynamic insulation equipped with a heated glazing according to the invention is shown, but with a sealed, double pane insulating glazing as the inner wall. Heated layer 15 is protected from outside contact since it is inside of a conventional sealed insulating double glazing normally positioned as the inside wall and having a spacer 17 filled with dehydrating agent 18 and glued between the panes 16 constituting the double glazing by an elastomer, for example, of polysulfide 19. Electric current is provided to the heated layer by two conducting strips of the type of that shown at 20. If heated layer 15 is not the layer with low emissivity, the layer 21 of low emissivity may be located on the outside of the plate 16 that faces the circulating air 9 between the pane 16 and the outer glazing 16a, but layer 21 could also be on the heated glass itself, on the side opposite heating layer 15.

Figure 7:
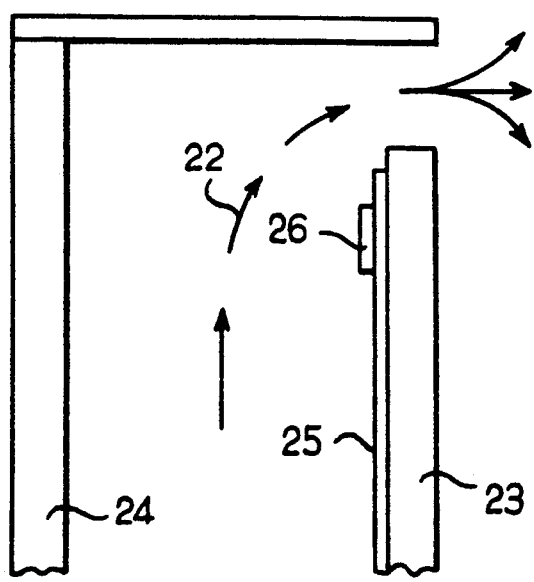

FIG. 7 shows a preferred variant of the invention in which a wall consisting of two plates 23 and 24 between which a current of fresh air 22 circulates. One of plates 23 is heated and the air is directed to the inside of the room. Cold plate 24 is positioned toward the outside. The air is sucked in from the outside, preferably, in the lower part of plate 24, but any other air circulation system in which the fresh air circulates along the warm plate 23 would also be suitable.

Heated plate 23 is equipped on the side opposite the room with a low emissivity layer 25 able to withstand cleaning operations without degradation. This layer, similar to layer 12 of FIG. 5 or to layer 21 of FIG. 6, here also acts as heating layer. It therefore has been equipped with power lead-in strips 26 spaced so that by connecting them to a source of available electric voltage, the maximum desired surface power can be used. Actually, for economic reasons, rather than adapting the layer to the dimensions of the plate and to the available electric voltage, it generally is preferred always to use the same layer, and to adapt the electric parameters, voltage and/or duration of the pulses so as to reach the desired surface power. For example, the surface temperature of the warm wall and/or temperature of the entering air can be used for determining the overall electric power necessary at a given moment as a function of constraints such as, for example, the set value of the temperature of the room, actual value of this temperature, outside temperature, hour of the day, etc.

To be able to broaden to the maximum the field of possible use, it is desired to be able to use the highest electric voltages, in particular that of the available public distribution network. This requires having suitable installation conditions which use insulating mastics and avoid any contact of the low emissivity layer with the electrical conducting elements and providing suitable safety systems. Actually, layer 25 needs to periodically undergo maintenance because the passage of air can dirty it. It therefore is necessary for the wall to be able to be opened so as to make such a cleaning possible. It is necessary under these conditions that if the voltage normally used is dangerous, the power supply will be automatically cut off when the panel is opened. A system similar to that of patent FR 2 180 433 is suitable. Likewise, it is necessary to prevent the power supply from being maintained in case one of panes 23 or 24 is broken.

As in the general case, the panes are tempered; systems for detecting the breakage of normal tempered glass such as, for example, the one described in European patent application EP 33 857 can be used. For glass 24, it is sufficient to verify, thanks to electronics of known design, that the passage of the current is not interrupted.

Thus, it is seen from the preceding description that the invention provides an efficient wall, economical in its consumption of energy and inexpensive in investment. Actually, it is possible to use mass-produced and therefore inexpensive low emissivity layers, to use only a single layer and, by use of a suitable regulation system, to operate by using the voltage from the power line.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S. is:

1. A glazed wall comprising:
   a sealed double pane inside glazing positioned facing the interior of a room for which the glazed wall forms an exterior wall;
   an outside glazing positioned facing an outside environment which may be at low temperature, said inside and outside glazings forming a space through which outside air can circulate past the inside glazing for discharge into the room;
   means for circulating outside air through said space comprising a frame for said outside glazing, the frame for said outside glazing having an opening below said outside glazing, and a frame for said inside glazing, the frame for said inside glazing having an opening above said inside glazing;
   electrical heating means formed of a transparent conducting layer positioned within the double pane glazing for heating one pane of said inside glazing, said conducting layer on a pane of said double pane glazing facing the room, whereby heat is transferred by conduction to the air circulating in the space;
   a low radiation emissivity layer, formed of a transparent semiconducting fluorine doped $SnO_2$ having a thickness of 420 nm, on a face of the other pane of said inside glazing opposite that facing the interior of the room, whereby radiative heat transfer to said outside glazing is reduced; and
   a spacer filled with a dehydrating agent positioned between the panes of said inside glazing.

2. The glazed wall of claim 1 wherein said glazed wall is a stationary wall.

3. The glazed wall of claim 1 wherein said glazed wall is a closure for a door or window.

* * * * *